United States Patent [19]

Todd

[11] Patent Number: 4,722,556
[45] Date of Patent: Feb. 2, 1988

[54] RECREATIONAL VEHICLE SEWERLINE ADAPTER

[75] Inventor: Harry V. Todd, El Cajon, Calif.

[73] Assignee: Toddco Partnership, El Cajon, Calif.

[21] Appl. No.: 871,489

[22] Filed: Jun. 6, 1986

Related U.S. Application Data

[63] Continuation-in-part of Ser. No. 800,171, Nov. 14, 1985, Pat. No. 4,660,860, and a continuation-in-part of Ser. No. 855,924, Apr. 25, 1986, Pat. No. 4,688,833.

[51] Int. Cl.$^4$ .............................................. F16L 55/00
[52] U.S. Cl. ....................................... 285/12; 285/177; 285/179; 285/903
[58] Field of Search ................. 285/12, 177, 176, 175, 285/903, 7, 272, 275

[56] References Cited

U.S. PATENT DOCUMENTS

| | | | |
|---|---|---|---|
| 2,556,627 | 6/1951 | Miksis | 285/177 X |
| 3,741,179 | 10/1969 | Sixt | 285/903 X |
| 3,757,280 | 9/1973 | Staschewsri | 285/903 X |
| 3,797,865 | 3/1974 | Ballentyne | 285/175 |
| 4,173,989 | 11/1979 | Prest | 285/177 X |

FOREIGN PATENT DOCUMENTS 20213 12/1980 European Pat. Off. ............ 285/903

577152 6/1976 Switzerland ....................... 285/177

Primary Examiner—Thomas F. Callaghan
Attorney, Agent, or Firm—Bernard L. Kleinke

[57] ABSTRACT

An adapter for coupling a corrugated drainpipe to a sewage disposal site employs a tubular member which is hollow throughout its length for connecting the drainpipe in fluid communication with a sewage disposal site. The tubular member has a drainpipe end portion having a complementary shape and size adapted to engage threadably an end of a corrugated drainpipe, and a sewer inlet end portion adapted to be inserted through an inlet opening of a sewage disposal site. A helically-shaped thread extending axially along the drainpipe end portion is complementary sized and shaped relative to the corrugations of the corrugated drainpipe to enable threaded engagement of the corrugated drainpipe, while a nozzle section of the sewer inlet end portion has an outside diameter progressively decreasing toward a distal end of the sewer inlet end portion, both for enabling the sewer inlet end portion to generally mate with an inlet opening into which the sewer inlet end portion is inserted and for engaging the disposal site structure defining the inlet opening to thereby cover over the inlet opening.

7 Claims, 5 Drawing Figures

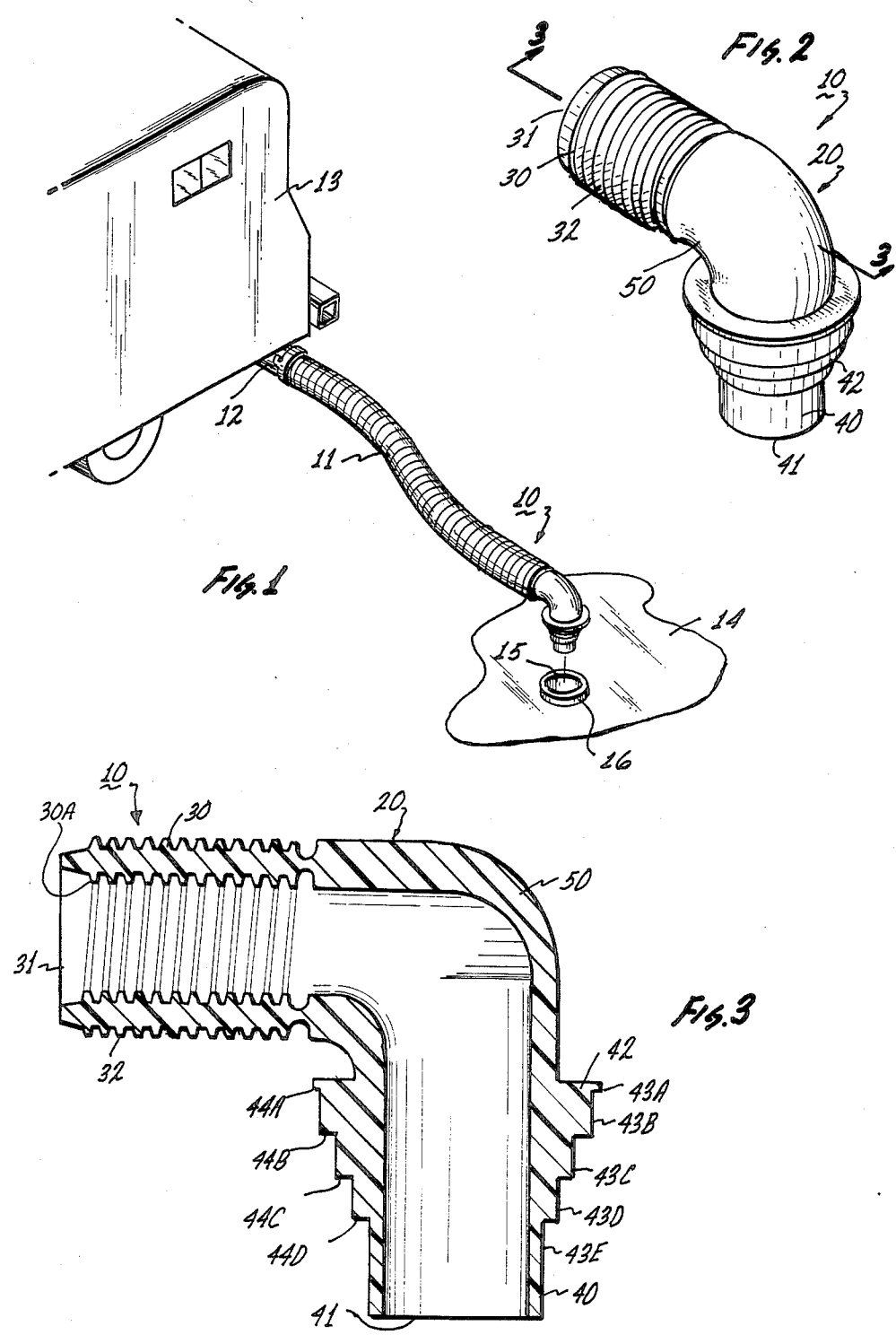

RECREATIONAL VEHICLE SEWERLINE ADAPTER

CROSS-REFERENCES TO RELATED APPLICATIONS

This application is a continuation-in-part of copending U.S. patent application Ser. No. 800,171, filed Nov. 14, 1985, now U.S. Pat. No. 4,660,860 and copending U.S. patent application Ser. No. 855,924, filed Apr. 25, 1986 now U.S. Pat. No. 4,688,833.

BACKGROUND OF THE INVENTION

1. Technical Field

This invention relates generally to flexible pipe adapters, and particularly to an adapter for interconnecting in fluid communication a corrugated drainpipe and the inlet opening of a sewage disposal site.

2. Background Art

In order to maximize enjoyment of recreational vehicles, when parked at a camp site, it is desirable to quickly and effectively connect the outlet of the discharge soil pipe of the vehicle in fluid communication with a waste disposal site inlet opening quickly and effectively. A flexible drainpipe called "corrugated pipe" is often used for this purpose. Formed from a coiled spring imbedded within a plastic casing, it offers both the strength and flexibility needed for typical camping use, and yet compresses axially for storage purposes. The casing extends along the helical outline of the coiled spring to provide it with the appearance of a corrugated pipe.

Such a drainpipe usually has a diameter of approximately three inches, to provide adequate drainage for most recreational vehicle requirements. Sections of like pipe can be coupled together, end-to-end, in fluid communication, to achieve a line of desired length. One end of the line is coupled to the outlet of the discharge pipe on the recreational vehicle, and the other end is coupled to the disposal site. A fitting is usually employed at the disposal site end, and is adapted to be attached to the drainpipe and inserted through an inlet opening at the disposal site.

However, the existing fittings used at the disposal site end of the line suffer from certain drawbacks. For example, some existing couplers are designed to have one end forced manually into the drainpipe, and the other end inserted loosely into the inlet opening. Considerable effort and skill is required to force such fittings into the drainpipe. In addition, the resulting joint is not entirely mechanically secure. Furthermore, the loose fit at the disposal site end allows noxious fumes to escape, and allows accidental and unwanted dislodging of the fitting from the disposal site inlet opening.

There have been many different types and kinds of couplers and adapters, some of which have been employed for recreational vehicle waste disposal lines. Refer, for example, to U.S. Pat. Nos. 4,231,595; 3,760,430; 2,988,755; 4,173,989; 4,133,347 and 4,223,702. However, none of the foregoing patents disclose devices capable of the abovementioned problems.

Consequently, it is desirable to have a new and improved adapter device for coupling a flexible drainpipe to a disposal site inlet opening in a convenient manner. It is furthermore desirable to have an adapter that can be rapidly assembled to the drainpipe, and then to the disposal site inlet, with little skill and attention. It is desirable to have an adapter that produces a better, stronger, tighter joint. Moreover, it is desirable to have an adapter that mates with different disposal site inlet opening sizes, as well as preventing, or at least inhibiting the unwanted escape of noxious fumes at the connection to the inlet opening.

There have been many different types and kinds of couplers and adapters. Refer, for example, to U.S. Pat. Nos. 4,231,595, 3,760,430, 2,988,755, 4,173,989, 4,133,347, and 4,223,702. But, none of these solve the problems mentioned above.

SUMMARY OF THE INVENTION

Therefore, the principal object of the present invention is to provide a new and improved adapter for coupling a flexible recreational vehicle drainpipe to a disposal site inlet in a convenient, secure manner.

It is a further object of the present invention to provide such a new and improved adapter, which is easy and convenient to install, and disassemble, while providing a joint of substantial mechanical strength and yet relatively inexpensive to manufacture.

It is another object of the present invention to provide such an adapter, which can be used with various different disposal site inlet opening sizes, while preventing, or at least inhibiting, the escape of noxious fumes at inlet opening.

Briefly, the above and further objects of the present invention are realized by providing an adapter employing a tubular member which is hollow throughout its axial length for connecting the drainpipe in fluid communication with a sewage disposal site. The tubular member has a drainpipe end portion having a complementary shape and size adapted to engage threadably an end of a corrugated drainpipe, and a sewer inlet end portion adapted to be inserted through an inlet opening of a sewage disposal site.

A helically-shaped thread extending axially along the drainpipe end portion is complementary sized and shaped relative to the size of the opening of the corrugated drainpipe, to enable convenient threaded engagement of the corrugated drainpipe. A nozzle section of the sewer inlet end portion has an outside diameter progressively decreasing toward a distal end of the sewer inlet end portion, both for enabling the sewer inlet end portion to generally mate with an inlet opening into which the sewer inlet end portion is inserted and for engaging the disposal site structure defining the inlet opening to cover over the inlet opening. Thus, noxious fumes are inhibited from escaping from the inlet opening.

One form of the invention includes a nozzle section having an outside diameter progressively decreasing axially toward a distal terminal end of the sewer inlet end portion, in a series of discrete steps. In this regard, a series of annular shoulders spaced axially along the nozzle section, extend radially outward therefrom forming a series of steps in the outside diameter, to engage a corresponding ones of different sized inlet openings. A portion of the annular shoulders overlies the disposal site structure defining the inlet opening when the sewer inlet end portion of the inventive adapter is inserted into the inlet opening for covering it to inhibit the release of noxious fumes therefrom.

Thus, the new and improved adapter, conveniently connects to conventional corrugated drainpipe with a superior joint by merely threading into it. The adapter easily mates with the inlet opening of a selected sewage disposal site. In addition, the series of stepped shoulders of the nozzle section, provides an integral cover for the inlet opening to the disposal site.

The adapter can be easily threaded onto the disposal site end of a corrugated drainpipe, without the need for prying and pounding, and the usual need for excessive manually applied force. Thus, an easy and convenient installation is achieved, while providing a highly superior joint, which is tighter, stronger, and far less prone to inopportune dislodgement. Once threaded into the end of the corrugated drainpipe, the other end of the adapter is simply inserted into the disposal site inlet opening in a relatively close fit manner, to fit securely in place and to cover over the inlet opening in one operation.

BRIEF DESCRIPTION OF THE DRAWINGS

The above and further objects and features of this invention and the manner of attaining them, will become apparent, and the invention itself will be best understood, by reference to the following description of embodiments of the invention, taken in conjunction with the accompanying drawings, wherein:

FIG. 1 of the drawings is a pictorial, fragmentary view of a recreational vehicle waste discharge sewer-line adapter, which is constructed according to the present invention, and which is shown interconnecting a drainpipe and sewage disposal site inlet opening;

FIG. 2 is an enlarged pictorial view of the sewerline adapter of FIG. 1;

FIG. 3 is a greatly enlarged sectional view of the sewerline adapter of FIG. 2, taken substantially on line 3—3 of FIG. 2;

DESCRIPTION OF THE PREFERRED EMBODIMENTS

Figure 4:
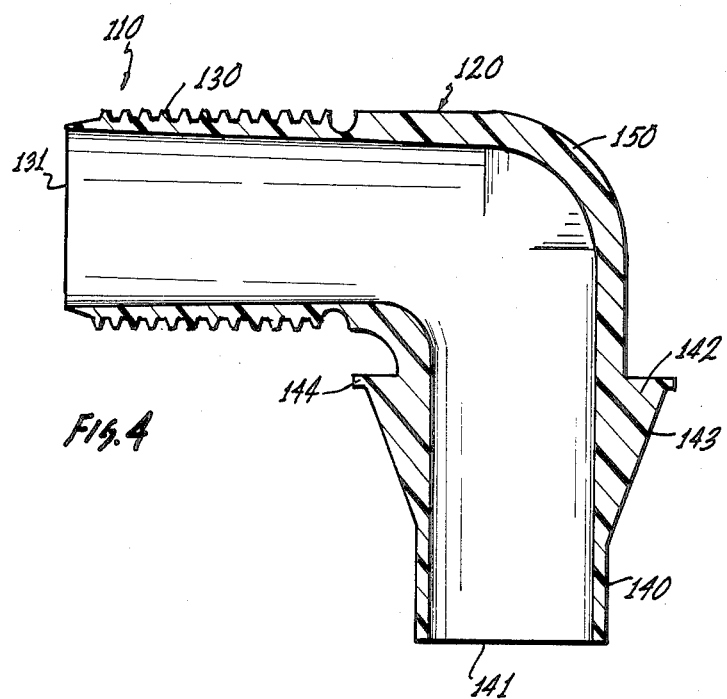
FIG. 4 is a sectional view of another sewerline adapter, which is also constructed according to the present invention.

Referring now to the drawings, and more particularly to FIGS. 1, 2 and 3 thereof, there is shown an adapter 10, which is constructed according to the invention, and which is connected to an end of a corrugated flexible drainpipe 11, extending from a waste discharge pipe 12 of a recreational vehicle 13. Connected in this manner, adapter 10 is used to interconnect the corrugated drainpipe 11 in fluid communication with a waste disposal site 14 when the adapter is inserted into an inlet opening 15 defined by the waste disposal site structure 16.

The adapter 10 is of unitary, one-piece construction, and comprises a tubular member 20, which is generally circular in cross section and hollow throughout its length. The adapter 10 connects the drainpipe 11 in fluid communication with the sewage disposal site 14. The adapter 10 is composed of a suitable thermoplastic material, which is injection molded to the desired configuration according to well known fabrication techniques, and it includes an opened drainpipe end portion 30, an opened sewer inlet end portion 40, and a midportion 50.

The drainpipe end portion 30 of the tubular member 20 is adapted to fit into and to engage threadably a corrugated drainpipe end of a complementary size and shape. Alternately, the drainpipe end portion 30 can be dimensioned to fit over the drainpipe, and it can be provided with internal threads (not shown) for engaging threadably the outer surface of the drainpipe.

The drainpipe end portion 30 is formed with a helically-shaped external thread 32 which mates with the corrugations of the corrugated drainpipe 11 (FIG. 1). A terminal end 31 of the drainpipe end portion 30, is inserted into an end of the drainpipe 11, and the adapter 10 is rotated about the axis of the end 30, to thread it into the end of the drainpipe 11.

The sewer inlet end portion 40 of the tubular member 20 is adapted to be inserted through the inlet opening 15, to interconnect the drainpipe in fluid communication with the sewage disposal site. A terminal end 41 of the sewer inlet end portion 40, extended downwardly through the inlet opening 15 for this purpose.

A nozzle section 42 of the sewer inlet end portion 40 has an outside diameter axially progressively decreasing toward the distal terminal end 41 of the sewer inlet end portion 40. This enables the sewer inlet end portion 40 to mate with different inlet opening sizes. At the same time, the adapter 10 engages the disposal site structure 16 defining the inlet opening 15 to cover over the inlet opening for blocking the escape of noxious fumes.

The nozzle section decreases in diameter in discrete steps. The section 42 includes four axially decreasing body portions 43B, 43C, 43D, and 43E, which are each selected to mate with four of the most popular, conventional disposal site inlet openings. Thus, the diameter of the body portion at 43B is approximately 4 inches, and the diameters of the smaller body portions at 43C, D and E decrease in diameter by ½ inch increments. Thus, as indicated in broken lines in FIG. 3, the body portion 43D has a diameter of 3 inches, and fits snugly within the 3 inch diameter circular inlet opening 15.

The nozzle section 42 thus includes a plurality of axially stepped annular portions 43B–43E, extending radially outwardly from the body of the nozzle section. These annular circular portions serve to engage the structure defining the disposal site inlet opening.

In order to cover over the inlet opening, each one of the portions 43B–43E includes a series of respective stepped shoulders 44A, 44B, 44C and 44D, for engaging and thus covering over the opening, such as the opening 15 by the shoulder 44C, as indicated in FIG. 3.

Thus, the nozzle section enables the sewer inlet portion 40 to mate with different inlet opening sizes, while at the same time engaging the disposal site structure defining the inlet opening to thereby cover the inlet opening.

A midportion 50 of the tubular member 20 extends between and interconnects the drainpipe end portion 30 at a 90° right angle to the sewer inlet end portion 40. Thus, the midportion 50 gives the adapter 10 the shape of a ninety degree elbow. Other angular offsets may also be employed, if desired.

An adapter 110 is also constructed according to the invention, and is illustrated in FIG. 4, where reference numerals are increased by 100 over those designating similar elements in FIGS. 1-3. The adapter 110 is generally similar to the adapter 10, except that the stepped body portions of the adapter 10, are replaced with a tapered portion.

A nozzle section 142 of the adapter 110 includes a tapered intermediate section 143, having an outside diameter that decreases in diameter axially toward the distal terminal end 141 of the sewer inlet end portion 140, in a generally continuous transition, in place of the step transition in the manner of the adapter 10 illustrated in FIGS. 1-3. The continuous transition of the tapered section 143 mates with various different inlet opening sizes having diameters in the same range as the tapered section 143. Thus, by constructing the adapter 110 from a somewhat compliant material, the nozzle section 142 generally conforms to a selected sewer inlet opening to provide a relatively tight fit.

Although the adapters illustrated in FIGS. 1-4 are of unitary, one-piece constructions and composed of a suitable thermoplastic material, other forms of construction are within the inventive concepts herein disclosed. For example, the nozzle section can be in the form of a rubber gasket member (not shown), having a decreasing diameter, either stepped or continuous, with the rubber member adapted to be fitted over a sewer inlet end portion (not shown).

Figure 5:
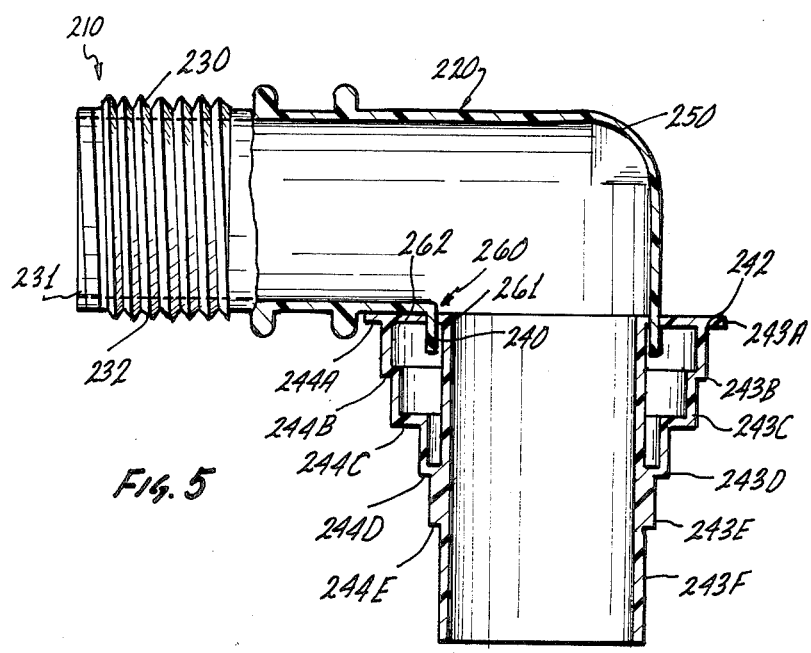
FIG. 5 is a sectional view of yet another sewerline adapter, which is also constructed according to the present invention.

A two-piece adapter 210 constructed according to the present invention, is illustrated in FIG. 5. The adapter 210 includes a nozzle member 242, which is detachable from an L-shaped drainpipe end portion 230, to facilitate connection thereto, as well as for storage purposes. The drainpipe end portion 230 is threaded into a flexible drainpipe, such as the drainpipe 11 of FIG. 1. A nozzle member 242 is inserted into the inlet opening of a sewage disposal site, and finally the sewer inlet end portion 240 is inserted into the nozzle member Nozzle member 242 includes an annular opening 261 defined between flat upper portions 261 and 262 of the nozzle member. This annular opening has a size and shape adapted to receive a sewer inlet end portion 240 projecting transversely at right angles from the end portion 230, to fit tightly within the circular opening 261. Thus, installation is greatly facilitated.

A finger hold 271 on the drainpipe portion facilitates grasping it by hands of the user.

Stepped body portions 243B-243F surround a central tubular pipe portion 273.

As various other changes may be made in the form, construction, and arrangement of the procedures and parts described herein, without departing from the spirit and scope of the invention and without sacrificing any of its advantages, all matter herein is to be interpreted as illustrative and not in any limiting sense.

What is claimed is:

1. An adapter for coupling a corrugated drainpipe to a sewage disposal site, comprising:
   a tubular member, the tubular member being hollow throughout its length for connecting the drainpipe in fluid communication with a sewage disposal site;
   a drainpipe end portion of the tubular member having a complementary shape and size adapted to engage threadably an end of a corrugated drainpipe;
   a sewer inlet end portion of the tubular member adapted to be inserted through an inlet opening of a sewage disposal site;
   thread means defining a helically-shaped thread extending axially along the drainpipe end portion so that the thread is complementary sized and shaped relative to the corrugations of the corrugated drainpipe to enable threaded engagement of the corrugated drainpipe;
   nozzle means defining a section of the sewer inlet end portion having an outside diameter progressively decreasing toward a distal end of the sewer inlet end portion in a series of substantial discrete steps;
   said nozzle means includes a plurality of flat radially extending shoulder means, each one of said shoulder means is adapted to overlie and to cover a substantial portion of an inlet opening into which the sewer inlet end portion is inserted;
   said nozzle means further includes a plurality of flat annular non-tapered axially-extending portions, each one of said flat annular portions is adapted to engage frictionally the disposal site structure defining the inlet opening; and
   each one of said shoulder means forms an L-shaped configuration with an adjacent one of said flat annular portions, to provide seal means, and to cause the adapter to be readily attachable and detachable.

2. An adapter as recited in claim 1, further including a mid portion of the tubular member extending between the drainpipe end portion and the sewer inlet end portion, said mid portion being generally L-shaped to axially offset the drainpipe end portion relative to the sewer inlet end portion.

3. An adapter as recited in claim 1, wherein:
   the thread means defines both an interior thread and an exterior thread to enable threaded engagement of different drainpipe sizes.

4. An adapter as recited in claim 1, wherein:
   the tubular member is of unitary construction.

5. An adapter as recited in claim 1, wherein:
   the tubular member is composed of a thermoplastic material.

6. An adapter as recited in claim 1, wherein:
   the tubular member has a shape defining a ninety degree elbow.

7. An adapter for coupling a corrugated drainpipe to a sewage disposal site, comprising:
   a tubular member, the tubular member being hollow throughout its length for connecting the drainpipe in fluid communication with a sewage disposal site;
   a nozzle member adapted to be inserted through an inlet opening of a sewage disposal site, the nozzle member including nozzle means having an outside diameter progressively decreasing toward a distal end of the nozzle member, both for enabling the nozzle member to generally mate with an inlet opening into which the distal end is inserted and for engaging the disposal site structure defining the inlet opening to thereby cover over the inlet opening, said nozzle member defining an annular opening into which to insert an end of the tubular member;
   a drainpipe end portion of the tubular member having a complementary shape and size adapted to engage threadably an end of a corrugated drainpipe, the drainpipe end portion including thread means defining a helically-shaped thread extending axially along the drainpipe end portion so that the thread is complementary sized and shaped relative to the corrugations of the corrugated drainpipe to enable threaded engagement of the corrugated drainpipe;
   a sewer inlet end portion of the tubular member adapted to be inserted through the annular opening in the nozzle member with a friction fit;
   said nozzle means includes a plurality of flat radially extending shoulder means, each one of said shoulder means is adapted to overlie and to cover a substantial portion of an inlet opening into which the sewer inlet end portion is inserted;
   said nozzle means further includes a plurality of flat annular non-tapered axially-extending portions, each one of said flat annular portions is adapted to engage frictionally the disposal site structure defining the inlet opening; and
   wherein each one of said shoulder means forms an L-shaped configuration with an adjacent one of said flat annular portions, to provide seal means, and to cause the adapter to be readily attachable and detachable.

* * * * *